United States Patent
Seo et al.

(10) Patent No.: US 11,114,710 B2
(45) Date of Patent: Sep. 7, 2021

(54) BATTERY MODULE, BATTERY PACK INCLUDING BATTERY MODULE, AND VEHICLE INCLUDING BATTERY PACK

(71) Applicant: LG Chem, Ltd., Seoul (KR)

(72) Inventors: Sung-Won Seo, Daejeon (KR); Dal-Mo Kang, Daejeon (KR); Jeong-O Mun, Daejeon (KR); Yoon-Koo Lee, Daejeon (KR); Alexander Eichhorn, Bietigheim-Bissingen (DE); Andreas Track, Bietigheim-Bissingen (DE)

(73) Assignee: LG Chem, Ltd.

( * ) Notice: Subject to any disclaimer, the term of this patent is extended or adjusted under 35 U.S.C. 154(b) by 118 days.

(21) Appl. No.: 16/622,076

(22) PCT Filed: Feb. 18, 2019

(86) PCT No.: PCT/KR2019/001929
§ 371 (c)(1),
(2) Date: Dec. 12, 2019

(87) PCT Pub. No.: WO2019/182251
PCT Pub. Date: Sep. 26, 2019

(65) Prior Publication Data
US 2020/0194851 A1 Jun. 18, 2020

(30) Foreign Application Priority Data
Mar. 21, 2018 (KR) .................. 10-2018-0032651

(51) Int. Cl.
*H01M 10/613* (2014.01)
*H01M 50/20* (2021.01)
(Continued)

(52) U.S. Cl.
CPC ....... *H01M 10/613* (2015.04); *H01M 10/625* (2015.04); *H01M 10/6567* (2015.04);
(Continued)

(58) Field of Classification Search
CPC .. H01M 10/613; H01M 50/20; H01M 50/502; H01M 10/625; H01M 10/6567;
(Continued)

(56) References Cited

U.S. PATENT DOCUMENTS

2011/0287285 A1  11/2011  Yoon
2012/0009456 A1  1/2012  Sohn
(Continued)

FOREIGN PATENT DOCUMENTS

EP   3291357 A1   3/2018
JP   201316301 A  1/2013
(Continued)

OTHER PUBLICATIONS

International Search Report from Application No. PCT/KR2019/001929 dated Jun. 7, 2019, 2 pages.
(Continued)

*Primary Examiner* — Stewart A Fraser
(74) *Attorney, Agent, or Firm* — Lerner, David, Littenberg, Krumholz & Mentlik, LLP (57) ABSTRACT

A battery module includes: a plurality of battery cells; a top plate configured to cover an upper side of the battery cells; a bottom plate configured to cover a lower side of the battery cells; a pair of side plates configured to cover both side surfaces of the battery cells; a bus bar unit configured to cover a front side and a rear side of the battery cells, the bus bar being electrically connected to the battery cells; and a pair of heatsinks each having a coolant injection portion and a coolant discharge portion protruding out of the battery module. The pair of heat sinks are provided at the upper side and the lower side of the battery cells, respectively.

14 Claims, 9 Drawing Sheets

(51) Int. Cl.
*H01M 50/502* (2021.01)
*H01M 10/625* (2014.01)
*H01M 10/6567* (2014.01)

(52) U.S. Cl.
CPC ......... *H01M 50/20* (2021.01); *H01M 50/502* (2021.01); *H01M 2220/20* (2013.01)

(58) Field of Classification Search
CPC ......... H01M 2220/20; H01M 10/6556; H01M 10/6551; H01M 10/658; H01M 50/50
See application file for complete search history.

(56) References Cited

U.S. PATENT DOCUMENTS

| | | | |
|---|---|---|---|
| 2014/0014418 A1* | 1/2014 | Komaki | H01M 10/0481 180/65.1 |
| 2014/0014420 A1* | 1/2014 | Nakamura | H01M 10/613 180/65.1 |
| 2014/0335390 A1 | 11/2014 | Hwang et al. | |
| 2015/0140388 A1 | 5/2015 | Harada et al. | |
| 2015/0236385 A1* | 8/2015 | Park | F28F 3/12 429/120 |
| 2016/0322678 A1* | 11/2016 | Park | H01M 10/6554 |
| 2016/0372805 A1 | 12/2016 | Kim et al. | |
| 2017/0200991 A1 | 7/2017 | Nam et al. | |
| 2018/0138565 A1 | 5/2018 | Lee et al. | |
| 2018/0151927 A1 | 5/2018 | An et al. | |
| 2018/0175464 A1 | 6/2018 | Kim et al. | |
| 2020/0388805 A1 | 12/2020 | Yoo et al. | |

FOREIGN PATENT DOCUMENTS

| | | |
|---|---|---|
| JP | 2014216298 A | 11/2014 |
| KR | 20110128639 A | 11/2011 |
| KR | 20120004321 A | 1/2012 |
| KR | 20140056835 A | 5/2014 |
| KR | 20150100365 A | 9/2015 |
| KR | 20170009098 A | 1/2017 |
| KR | 20170021122 A | 2/2017 |
| KR | 20170036639 A | 4/2017 |
| KR | 20170053429 A | 5/2017 |
| KR | 20170059178 A | 5/2017 |
| WO | 2013171885 A1 | 11/2013 |
| WO | 2017052050 A1 | 3/2017 |

OTHER PUBLICATIONS

Extended European Search Report including Written Opinion for Application No. 19772159.0 dated Jan. 14, 2021, 7 pages.

* cited by examiner

BATTERY MODULE, BATTERY PACK INCLUDING BATTERY MODULE, AND VEHICLE INCLUDING BATTERY PACK

CROSS-REFERENCE TO RELATED APPLICATIONS

The present application is a national phase entry under 35 U.S.C. § 371 of International Application No. PCT/KR2019/001929 filed Feb. 18, 2019, which claims priority to Korean Patent Application No. 10-2018-0032651 filed on Mar. 21, 2018, the disclosures of which are incorporated herein by reference.

TECHNICAL FIELD

The present disclosure relates to a battery module, a battery pack including the battery module, and a vehicle including the battery pack.

BACKGROUND ART

Secondary batteries, which are highly useful in various products and exhibit superior electrical properties such as high energy density, etc., are commonly used not only in portable devices but also in electric vehicles (EVs) or hybrid electric vehicles (HEVs) driven by electrical power sources. Secondary batteries are drawing attention as a new energy source for their environmental friendliness and energy efficiency, as the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series in configuring a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to first configure a battery module having at least one battery cell, and then configure a battery pack by using the at least one battery module and adding other components.

In the case of a conventional battery module, generally, a heatsink for cooling the battery module is separately mounted to an outer side of the battery module. In general, such heatsinks are separately mounted to a bottom surface of the battery module to indirectly cool the battery module from the bottom of the battery module.

However, the conventional heatsink structure, which is mounted separately to the outer side of the battery module, has a problem in that the cooling efficiency is low when cooling a high-specification battery module which has been widely increased in recent years due to the indirect cooling.

Therefore, it is desirable to provide a battery module capable of improving the cooling performance, a battery pack including the battery module, and a vehicle including the battery pack.

DISCLOSURE

Technical Problem

The present disclosure is directed to providing a battery module, which may improve the cooling performance, a battery pack including the battery module, and a vehicle including the battery pack.

Technical Solution

In one aspect of the present disclosure, there is provided a battery module, comprising: a plurality of battery cells; a top plate configured to cover an upper side of the battery cells; a bottom plate disposed opposite to the top plate to cover a lower side of the battery cells; a pair of side plates configured to connect the bottom plate and the top plate and to cover both side surfaces of the battery cells; a bus bar unit connected to the pair of side plates and configured to cover a front side and a rear side of the battery cells, the bus bar unit being electrically connected to the battery cells; and a pair of heatsinks each having a coolant injection portion and a coolant discharge portion protruding out of the battery module, and provided at the upper side and the lower side of the battery cells, respectively.

The battery pair of heatsinks may include a first heatsink disposed between the upper side of the battery cells and the top plate; and a second heatsink disposed between the lower side of the battery cells and the bottom plate.

The first heatsink and the second heatsink may each have the coolant injection portion and the coolant discharge portion, and may each also have a coolant channel therein for allowing a coolant to flow therein.

The battery module may further comprise a pair of insulation pads provided between the first heatsink and the top plate and between the second heatsink and the bottom plate.

The battery module may further comprise a pair of heat transfer plates provided between the first heatsink and the battery cells and between the second heatsink and the battery cells.

The battery module may further comprise a pair of insulation plates provided between the pair of side plates and both side surfaces of the battery cells.

The coolant injection portion and the coolant discharge portion may protrude out of the bus bar unit at a front side of the battery module.

The coolant injection portion and the coolant discharge portion may protrude out of the top plate at one side of the battery module.

In addition, the present disclosure provides a battery pack, comprising: at least one battery module according to the above embodiments; and a pack case configured to package the at least one battery module.

Moreover, the present disclosure provides a vehicle, comprising at least one battery pack according to the above embodiment.

Advantageous Effects

According to various embodiments as above, it is possible to provide a battery module, which may improve the cooling performance, a battery pack including the battery module, and a vehicle including the battery pack.

DESCRIPTION OF DRAWINGS

The accompanying drawings illustrate a preferred embodiment of the present disclosure and, together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
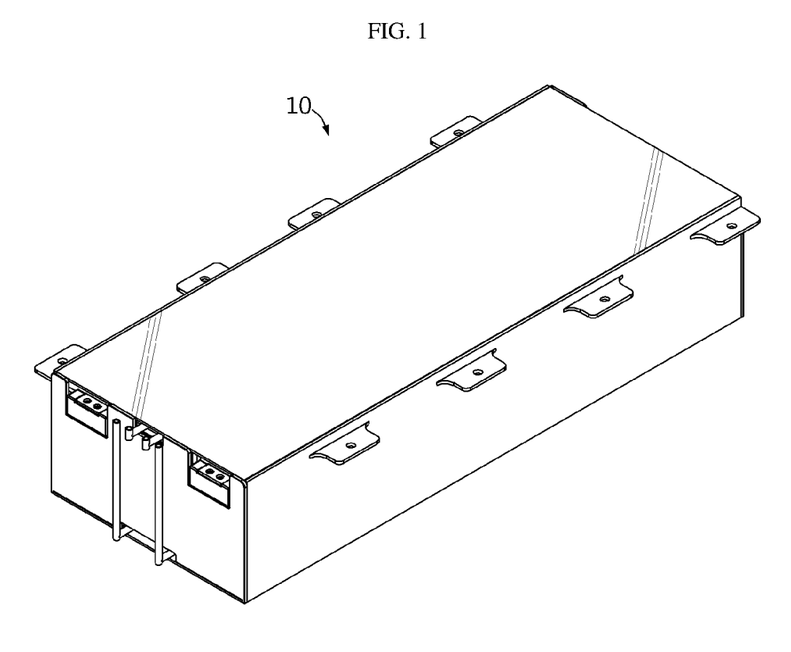
FIG. 1 is a perspective view illustrating a battery module according to an embodiment of the present disclosure.
Figure 2:
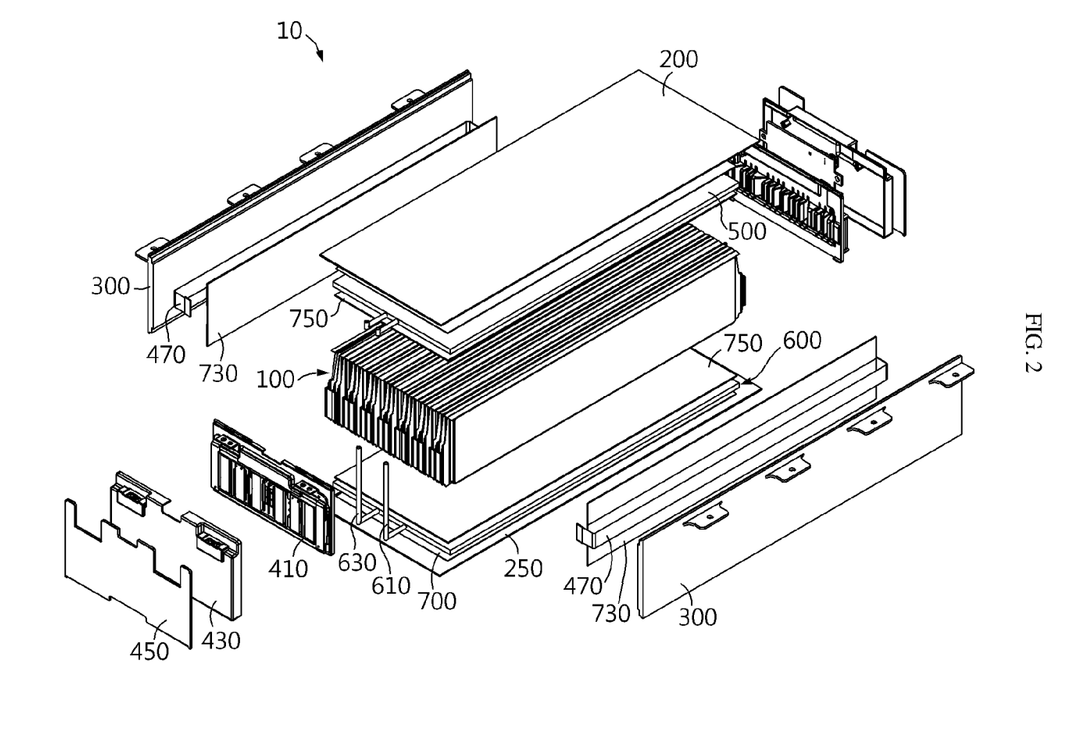
FIG. 2 is an exploded perspective view showing the battery module of FIG. 1.
Figure 3:
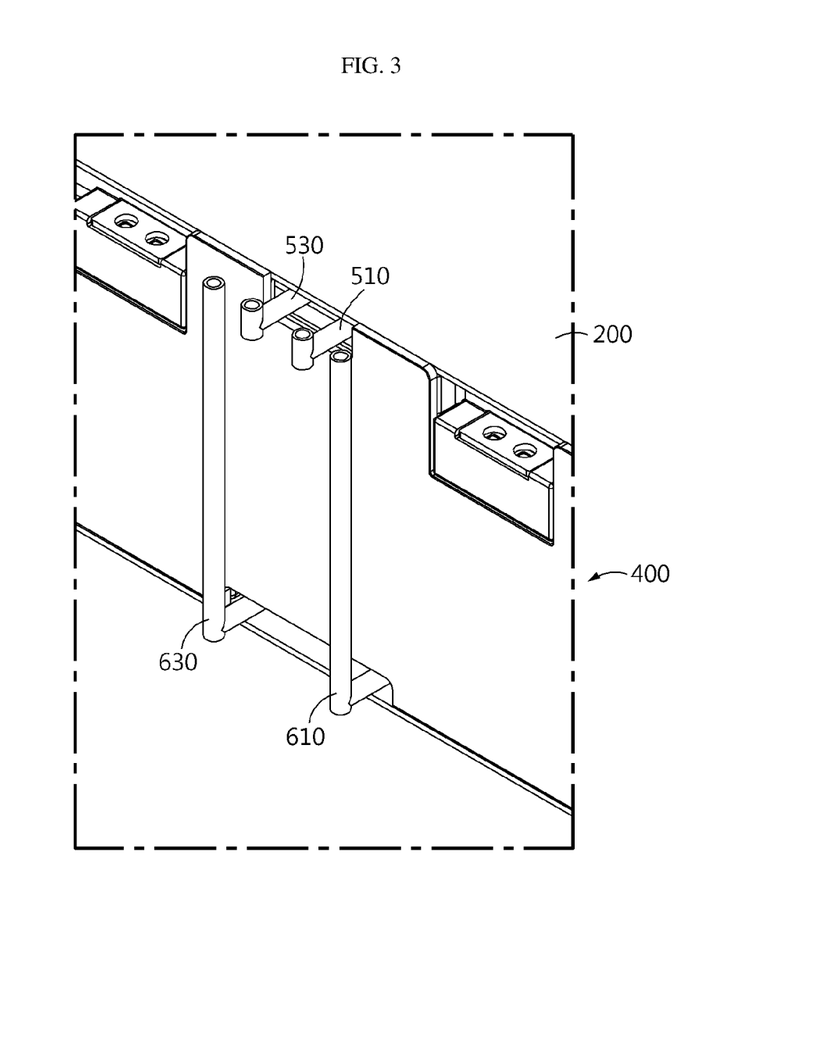
FIG. 3 is an enlarged view showing a main part of the battery module of FIG. 1.
Figure 4:
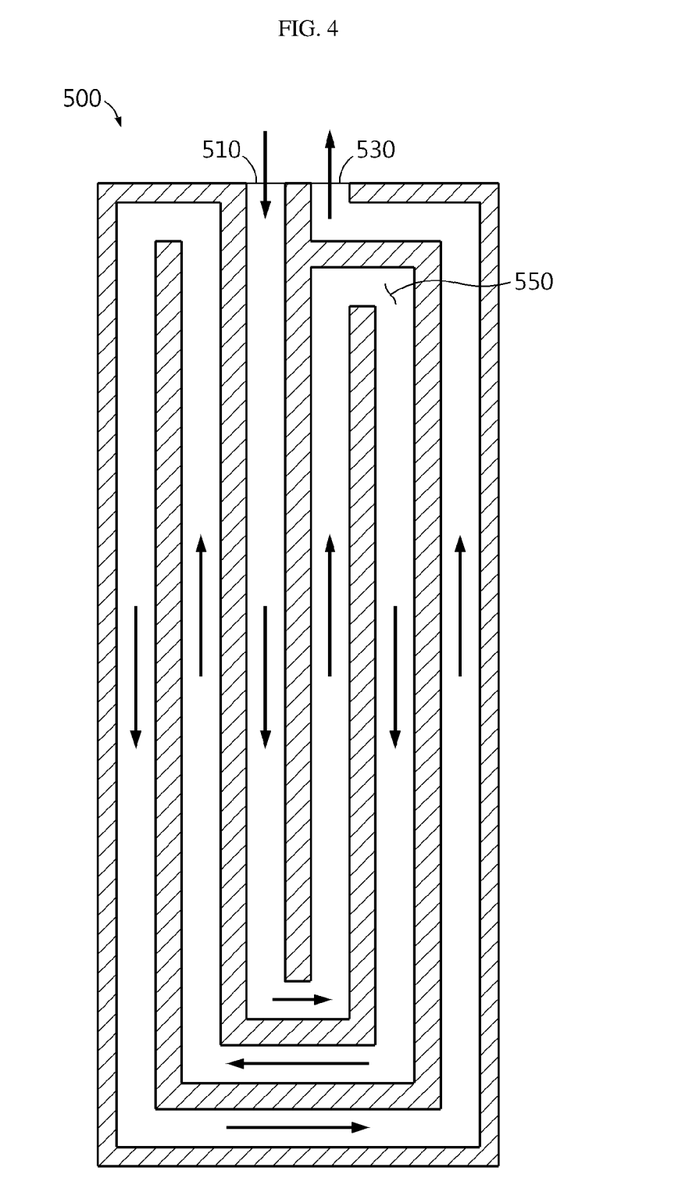
FIG. 4 is a diagram illustrating a coolant channel of a heatsink in the battery module of FIG. 2.

FIG. 1 is a perspective view illustrating a battery module according to an embodiment of the present disclosure, FIG. 2 is an exploded perspective view showing the battery module of FIG. 1, FIG. 3 is an enlarged view showing a main part of the battery module of FIG. 1, and FIG. 4 is a diagram illustrating a coolant channel of a heatsink in the battery module of FIG. 2.

Referring to FIGS. 1 to 4, the battery module 10 may include a battery cell 100, a top plate 200, a bottom plate 250, a side plate 300, a bus bar unit 400, heatsinks 500, 600, an insulation pad 700, an insulation plate 730, and a heat transfer plate 750.

The battery cell 100 may be a secondary battery, particularly a pouch-type secondary battery. A plurality of the battery cells 100 may be provided. The plurality of battery cells 100 may be stacked one each other so as to be electrically connected to each other.

The top plate 200 covers an upper side of the battery cells 100 and may form an upper exterior of the battery module 10. The top plate 200 may be formed to have an area that substantially covers the entire upper side of the plurality of battery cells 100.

The bottom plate 250 covers a lower side of the battery cells 100 and may form a lower exterior of the battery module 10. The bottom plate 250 may be disposed opposite to the top plate 200.

The side plate 300 connects the top plate 200 and the bottom plate 250 and may cover both side surfaces of the battery cells 100. To this end, the side plate 300 may be provided in a pair.

The bus bar unit 400 is connected to the pair of side plates 300 and may cover front and rear sides of the battery cells 100. The bus bar unit 400 is electrically connected to the battery cells 100, senses the voltage of the battery cells 100, and connects the battery cells 100 to an external power source or the like.

The bus bar unit 400 may include a bus bar body 410, an insulation cover 430, a case cover 450, and a sensing wire member 470.

The bus bar body 410 is disposed opposite to the battery cells 100 at front and rear sides of the battery cells 100 and may be electrically connected to electrode leads of the battery cells 100.

The insulation cover 430 may cover the bus bar body 410 and the electrode leads of the battery cells 100 protruding out of the bus bar body 410 and connected to the bus bar body 410 at the front and rear sides of the battery cells 100.

The case cover 450 may cover the insulation cover 430 at the front and rear sides of the battery cells 100. The case cover 450 may form the exterior of the battery module 10 at the front and rear sides of the battery module 10.

The sensing wire member 470 may electrically connect the bus bar body 410 disposed at the front side of the battery cells 100 and the bus bar body 410 disposed at the rear side of the battery cells 100.

The sensing wire member 470 may be provided in a pair. The pair of sensing wire members 470 may be disposed along both side surfaces of the battery module 10 in the length direction of the pair of side plates 300 and may be provided between the pair of side plates 300 and the insulation plate 730, explained later.

The heatsink 500, 600 may be provided in a pair. The pair of heatsinks 500, 600 may be provided at the upper and lower sides of the battery cells 100, respectively, inside the battery module 10. That is, in this embodiment, the pair of heatsinks 500, 600 may not be separately mounted to the outer side of the battery module 10 but may be provided as integrated components inside the battery module 10.

The heatsink 500, 600 may include a first heatsink 500 and a second heatsink 600.

The first heatsink 500 may be disposed between the upper side of the battery cells 100 and the top plate 200. The first heatsink 500 may be formed to have a size capable of covering the entire upper side of the battery cells 100 at the bottom of the top plate 200.

The first heatsink 500 may include a coolant injection portion 510, a coolant discharge portion 530, and a coolant channel 550.

The coolant injection portion 510 may inject a coolant for cooling the battery cells 100 from an external cooling device or the like into the coolant channel 550, explained later, provided inside the first heatsink 500.

The coolant injection portion 510 may at least partially protrude out of the battery module 10. Specifically, the coolant injection portion 510 protrudes out of the bus bar unit 400 at the front side of the battery module 10 and may be connected to the external cooling device or the like at the outside of the bus bar unit 400.

The coolant discharge portion 530 at least partially protrudes out of the battery module 10 and may discharge the coolant from the coolant channel 550, explained later, provided inside the first heatsink 500 to the external cooling device or the like.

The coolant discharge portion 530 may at least partially protrude out of the battery module 10. Specifically, the coolant discharge portion 530 protrudes out of the bus bar unit 400 at the front side of the battery module 10 and may be connected to the external cooling device or the like at the outside of the bus bar unit 400.

The coolant channel 550 is used for allowing the coolant to flow and is provided inside the first heatsink 500. The coolant channel 550 may be connected to the coolant injection portion 510 and the coolant discharge portion 530.

The coolant channel 550 may form a flowing space for the coolant injected from the coolant injection portion 510 and may discharge the coolant to the coolant discharge portion 530 after the coolant flows completely.

As shown in FIG. 4, the coolant channel 550 may allow the coolant introduced from the coolant injection portion 510 to first flow toward a center portion of the first heatsink 500, then allow the coolant to gradually flow toward the outer side of the first heatsink 500, and then discharge the coolant to the coolant discharge portion 530. In the case of the battery cells 100 stacked on each other, the temperature near the center portion of the stacked battery cells 100 is generally higher than that of the outer periphery. In this embodiment, it is possible to preferentially cool the center portion of the battery cells 100 having a relatively higher temperature than the outer periphery of the battery cells 100 by means of the coolant channel 550, thereby minimizing the cooling variations among the battery cells 100.

The second heatsink 600 may be disposed between the lower side of the battery cells 100 and the bottom plate 250. The second heatsink 600 may be formed to have an area capable of covering the entire lower side of the battery cells 100 at the top of the bottom plate 250.

The second heatsink 600 may include a coolant injection portion 610, a coolant discharge portion 630, and a coolant channel (not shown).

The coolant injection portion 610 may at least partially protrude out of the battery module 10. Specifically, the coolant injection portion 610 protrudes out of the bus bar unit 400 at the front side of the battery module 10 and may be connected to the external cooling device or the like at the outside of the bus bar unit 400. Also, the coolant injection portion 610 may be disposed close to the coolant injection portion 510 of the first heatsink 500.

The coolant discharge portion 630 at least partially protrudes out of the battery module 10 and may discharge the coolant from the coolant channel provided inside the second heatsink 600 to the external cooling device or the like.

The coolant channel (not shown) may form a flowing space for the coolant inside the second heatsink 600. The coolant channel substantially corresponds to the coolant channel 550 of the first heatsink 500 and thus will not be described in detail again.

The insulation pad 700 may be provided in a pair. The pair of insulation pads 700 may be provided between the first heatsink 500 and the top plate 200 and between the second heatsink 600 and the bottom plate 250, respectively.

The insulation plate 730 may be provided in a pair. The pair of insulation plates 730 may be provided between the pair of side plates 300 and both side surfaces of the battery cells 100. The pair of sensing wire members 470 may be disposed on the pair of insulation plates 730.

The heat transfer plate 750 may be provided in a pair. The pair of heat transfer plates 750 may be provided between the first heatsink 500 and the battery cells 100 and between the second heatsink 600 and the battery cells 100, respectively.

As described above, since the pair of heatsinks 500, 600 are disposed at the upper and lower sides of the battery cells 100 inside the battery module 10, the battery module 10 according to this embodiment may achieve more direct cooling, compared to a conventional heatsink structure that is separately mounted to the outer portion of the battery module 10. Also, the cooling path may be further simplified.

Therefore, the battery module 10 according to this embodiment may further improve the cooling performance of the battery module 10 by means of the pair of heatsinks 500, 600.

Figure 5:
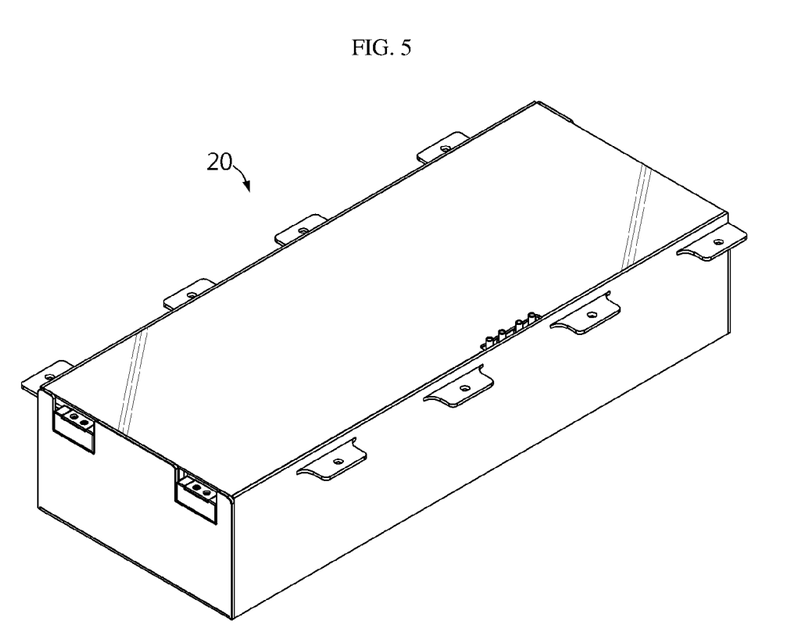
FIG. 5 is a perspective view illustrating a battery module according to another embodiment of the present disclosure.
Figure 6:
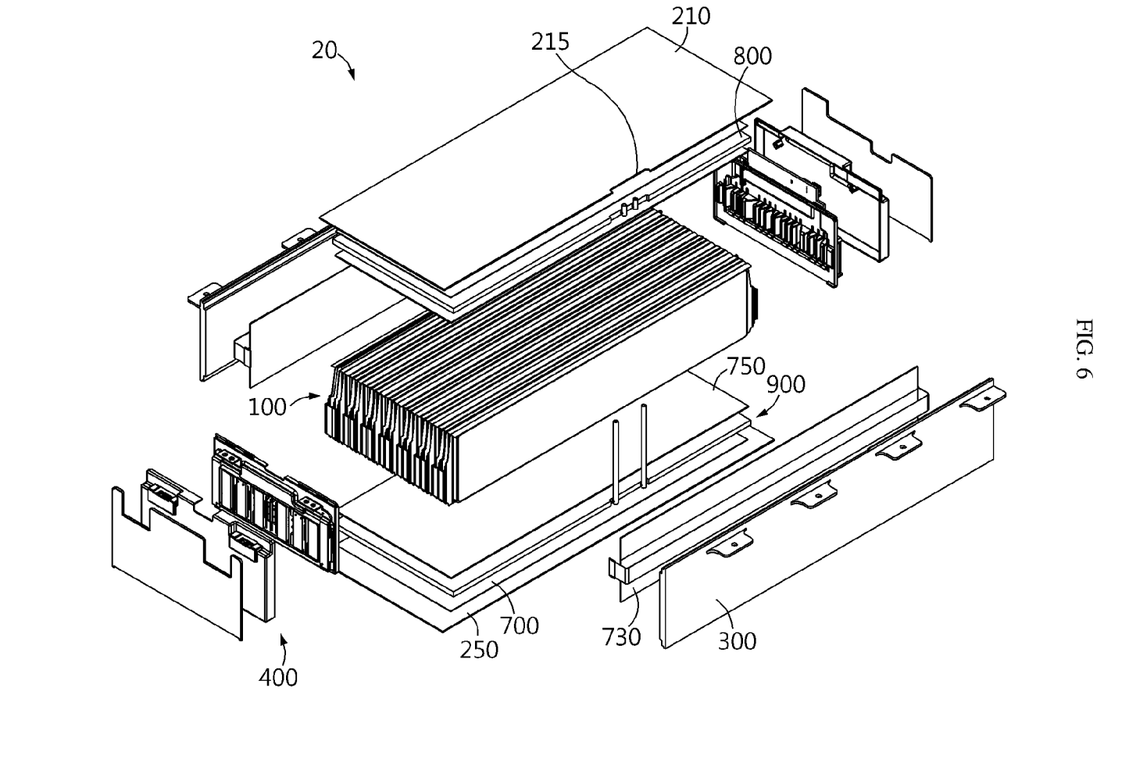
FIG. 6 is an exploded perspective view showing the battery module of FIG. 5.
Figure 7:
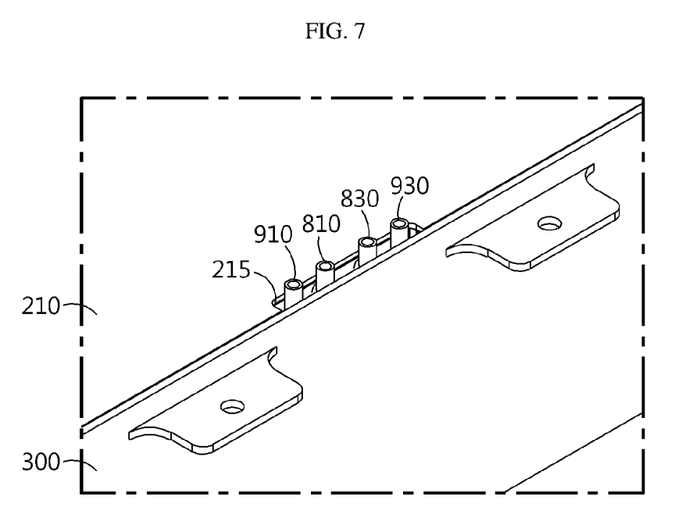
FIG. 7 is an enlarged view showing a main part of the battery module of FIG. 5.

FIG. 5 is a perspective view illustrating a battery module according to another embodiment of the present disclosure, FIG. 6 is an exploded perspective view showing the battery module of FIG. 5, and FIG. 7 is an enlarged view showing a main part of the battery module of FIG. 5.

Since the battery module 20 of this embodiment is substantially similar to the battery module 10 of the former embodiment, the identical or similar features will not be explained again, and the following description will focus on different features from the former embodiment.

Referring to FIGS. 5 to 7, the battery module 20 may include the battery cells 100, a top plate 210, the bottom plate 250, the side plate 300, the bus bar unit 400, the insulation pad 700, the insulation plate 730, the heat transfer plate 750 and heatsink 800, 900.

The battery cells 100 are substantially identical or similar to those of the former embodiment and thus will not be described in detail again.

The top plate 210 may have a guide groove 215.

The guide groove 215 may be formed on one side of the top plate 210 in the lateral direction. The guide groove 215 may allow coolant injection portions 810, 910 and coolant discharge portions 830, 930 of the heatsink 800, 900, explained later, to pass out of the top plate 210 therethrough.

The bottom plate 250, the side plate 300, the bus bar unit 400, the insulation pad 700, the insulation plate 730 and the heat transfer plate 750 are substantially identical or similar to those of the former embodiment and thus will not be described in detail again.

The heatsinks 800, 900 may include a first heatsink 800 and a second heatsink 900.

The first heatsink 800 may include a coolant channel (not shown), a coolant injection portion 810, and a coolant discharge portion 830.

The coolant channel is substantially identical or similar to that of the former embodiment and thus will not be described in detail again.

The coolant injection portion 810 and the coolant discharge portion 830 may at least partially protrude out of the top plate 210 at one side of the battery module 20. Specifically, the coolant injection portion 810 and the coolant discharge portion 830 may protrude out of the guide groove 215 of the top plate 210 and be connected to the external cooling device or the like.

The second heatsink 900 may include a coolant channel (not shown), a coolant injection portion 910, and a coolant discharge portion 930.

The coolant channel is substantially identical or similar to that of the former embodiment and thus will not be described in detail again.

The coolant injection portion 910 and the coolant discharge portion 930 may at least partially protrude out of the top plate 210 at one side of the battery module 20. Specifically, the coolant injection portion 910 and the coolant discharge portion 930 may protrude out of the guide groove 215 of the top plate 210 and be connected to the external cooling device or the like.

As in this embodiment, the coolant injection portions 810, 910 and the coolant discharge portions 830, 930 of the pair of heatsinks 800, 900 may protrude at the upper side of one side of the battery module 20 and be connected to the external cooling device or the like.

Figure 8:
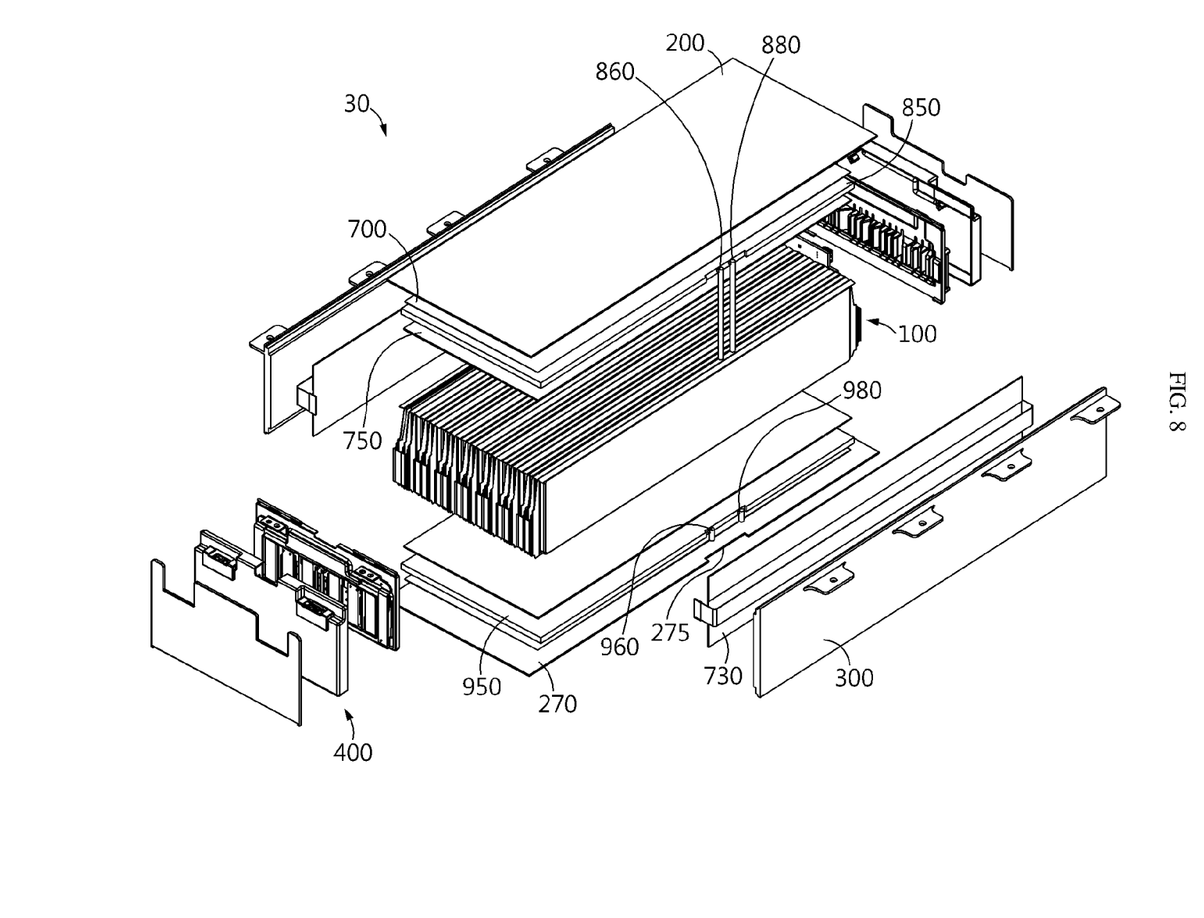
FIG. 8 is an exploded perspective view illustrating a battery module according to still another embodiment of the present disclosure.

FIG. 8 is an exploded perspective view illustrating a battery module according to still another embodiment of the present disclosure.

Since the battery module 30 of this embodiment is substantially similar to the battery modules 10, 20 of the former embodiments, the identical or similar features will not be explained again, and the following description will focus on different features from the former embodiments.

Referring to FIG. 8, the battery module 30 may include the battery cells 100, the top plate 210, the bottom plate 270, the side plate 300, the bus bar unit 400, the insulation pad 700, the insulation plate 730, the heat transfer plate 750, and heatsinks 850, 950.

The battery cells 100 and the top plate 210 are substantially identical or similar to those of at least one of the former embodiments and thus will not be described in detail again.

The bottom plate 270 may have a guide groove 275.

The guide groove 275 may be formed at one side of the bottom plate 270 in the lateral direction. The guide groove 275 may allow coolant injection portions 860, 960 and coolant discharge portions 880, 980 of the heatsinks 850, 950, explained later, to pass out of the bottom plate 270.

The side plate 300, the bus bar unit 400, the insulation pad 700, the insulation plate 730 and the heat transfer plate 750 are substantially identical or similar to those of at least one of the former embodiments and thus will not be described in detail again.

The heatsinks 850, 950 may include a first heatsink 850 and a second heatsink 950.

The first heatsink 850 may include a coolant channel (not shown), a coolant injection portion 860, and a coolant discharge portion 880.

The coolant channel is substantially identical or similar to that of the former embodiments and thus will not be described in detail again.

The coolant injection portion 860 and the coolant discharge portion 880 may at least partially protrude out of the bottom plate 270 at one side of the battery module 30. Specifically, the coolant injection portion 860 and the coolant discharge portion 880 may protrude out of the guide groove 275 of the bottom plate 270 and be connected to the external cooling device or the like.

The second heatsink 950 may include a coolant channel (not shown), a coolant injection portion 960, and a coolant discharge portion 980.

The coolant channel is substantially identical or similar to that of the former embodiments and thus will not be described in detail again.

The coolant injection portion 960 and the coolant discharge portion 980 may at least partially protrude out of the bottom plate 270 at one side of the battery module 30. Specifically, the coolant injection portion 960 and the coolant discharge portion 980 may protrude out of the guide groove 275 of the bottom plate 270 and be connected to the external cooling device or the like.

As in this embodiment, the coolant injection portions 860, 960 and the coolant discharge portions 880, 980 of the pair of heatsinks 850, 950 may protrude at the lower side of one side of the battery module 30 and be connected to the external cooling device or the like.

Figure 9:
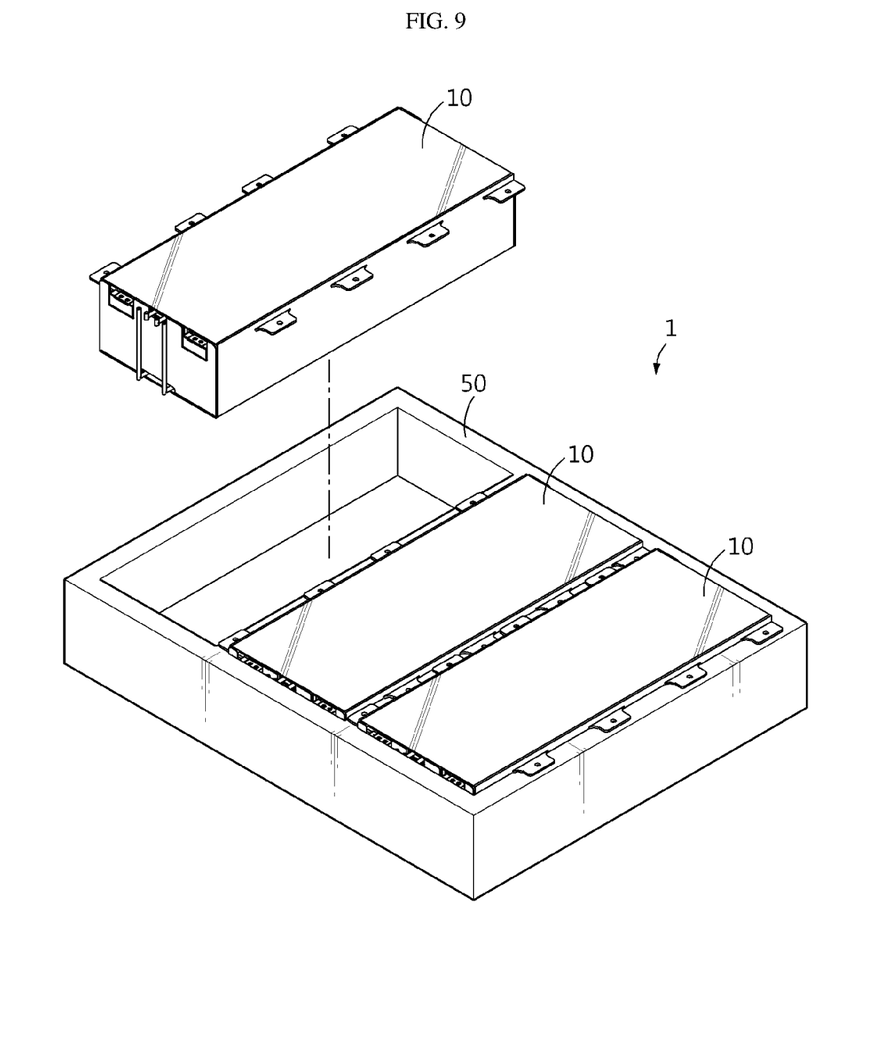
FIG. 9 is a perspective view illustrating the assembly of a battery pack according to an embodiment of the present disclosure.

FIG. 9 is a perspective view illustrating the assembly of a battery pack according to an embodiment of the present disclosure.

Referring to FIG. 9, a battery pack 1 may include at least one battery module 10 according to the former embodiment and a pack case 50 for packaging the at least one battery module 10.

Here, the at least one battery module may be the battery modules 20, 30 of the former embodiments. It is also possible that the battery module may be provided as a group of the battery module 10 and the battery modules 20, 30 of the former embodiments.

The battery pack 1 may be provided to a vehicle as a fuel source of the vehicle. As an example, the battery pack 1 may be provided to an electric vehicle, a hybrid vehicle, and various other-type vehicles capable of using the battery pack 1 as a fuel source.

In addition, the battery pack 1 may be provided in other devices, instruments or facilities, such as an energy storage system using a secondary battery, in addition to the vehicle.

As described above, the battery pack 1 of this embodiment and devices, instruments or facilities, such as a vehicle, which have the battery pack 1, include the battery module 10, 20, 30 as described above, and thus it is possible to implement a battery pack 1 having all the advantages of the battery module 10, 20, 30 described above, or devices, instruments, facilities or the like, such as a vehicle, which have the battery pack 1.

According to various embodiments as above, it is possible to provide a battery module 10, 20, 30, which may improve cooling performance, a battery pack 1 including the battery module 10, 20, 30, and a vehicle including the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood solely from the technical ideas and views of the present disclosure.

What is claimed is:

1. A battery module, comprising:
   a plurality of battery cells;
   a top plate configured to cover an upper side of the battery cells;
   a bottom plate disposed opposite to the top plate to cover a lower side of the battery cells;
   a pair of side plates configured to connect the bottom plate and the top plate and to cover both side surfaces of the battery cells;
   a bus bar unit connected to the pair of side plates and configured to cover a front side and a rear side of the battery cells, the bus bar unit being electrically connected to the battery cells; and
   a pair of heatsinks each having a coolant injection portion and a coolant discharge portion protruding out of the battery module, the pair of heat sinks being provided at the upper side and the lower side of the battery cells, respectively.

2. The battery module according to claim 1,
   wherein the pair of heatsinks includes:
   a first heatsink disposed between the upper side of the battery cells and the top plate; and
   a second heatsink disposed between the lower side of the battery cells and the bottom plate.

3. The battery module according to claim 2,
   wherein the first heatsink and the second heatsink each have a coolant channel therein for allowing a coolant to flow therein between the respective coolant injection portion and the respective coolant discharge portion.

4. The battery module according to claim 2, further comprising:
a first insulation pad provided between the first heatsink and the top plate; and a second insulation pad provided between the second heatsink and the bottom plate.

5. The battery module according to claim 2, further comprising:
a first heat transfer plate provided between the first heatsink and the battery cells and a second heat transfer plate provided between the second heatsink and the battery cells.

6. The battery module according to claim 1, further comprising:
a pair of insulation plates, each one of the pair of insulation plates being provided between one of the pair of side plates and a respective one of the side surfaces of the battery cells.

7. The battery module according to claim 6, wherein the bus bar unit includes:
a front bus bar body disposed at the front side of the battery cells;
a rear bus bar body disposed at the rear side of the battery cells; and
a pair of sensing wire members electrically connecting the front bus bar body and the rear bus bar body,
wherein each of the pair of sensing wire members is provided between one of the pair of insulation plates and a respective one of the side plates.

8. The battery module according to claim 1,
wherein the coolant injection portion and the coolant discharge portion protrude out of the bus bar unit at a front side of the battery module.

9. The battery module according to claim 1,
wherein the coolant injection portion and the coolant discharge portion protrude out of the top plate at one side of the battery module.

10. The battery module according to claim 9, wherein the coolant injection portion and the coolant discharge portion protrude out through a guide groove formed in the top plate.

11. A battery pack, comprising:
at least one battery module according to claim 1; and
a pack case configured to receive the at least one battery module therein.

12. A vehicle, comprising:
at least one battery pack according to claim 11.

13. The battery module according to claim 1, wherein the bus bar unit includes:
a front bus bar body disposed at the front side of the battery cells; and
a rear bus bar body disposed at the rear side of the battery cells.

14. The battery module according to claim 13, wherein the bus bar unit includes:
a sensing wire member electrically connecting the front bus bar body and the rear bus bar body.

* * * * *